United States Patent [19]

Grant et al.

[11] 3,859,557

[45] Jan. 7, 1975

[54] HIGH SPEED MAGNETIC DEFLECTION AMPLIFIER HAVING LOW-POWER DISSIPATION

[75] Inventors: Jon H. Grant, Diamond Bar; Raymond W. Pauly, Costa Mesa, both of Calif.

[73] Assignee: Hughes Aircraft Company, Culver City, Calif.

[22] Filed: July 5, 1973

[21] Appl. No.: 376,477

Related U.S. Application Data

[63] Continuation of Ser. No. 177,879, Sept. 3, 1971, abandoned.

[52] U.S. Cl. .......................... 315/27 TD, 178/7.5 R 315/395, 315/365

[51] Int. Cl. .......................................... H01j 29/70

[58] Field of Search ............... 315/27 TD, 27 R, 26; 198/7.5 R

[56] References Cited

UNITED STATES PATENTS 3,453,555 7/1969 Bacon ................................ 315/26

3,628,083 12/1971 Holmes ......................... 315/27 TD

*Primary Examiner*—Maynard R. Wilbur

*Assistant Examiner*—J. M. Potenza

*Attorney, Agent, or Firm*—W. H. MacAllister; Rafael A. Cardenas

[57] ABSTRACT

A high speed magnetic deflection amplifier using switched voltages and a high impedance voltage amplifier for providing a high voltage drive with a minimum of power dissipation and with a relatively wide bandwidth. The voltage amplifier stage is designed to handle slew voltages while normally operating at character writing levels with relatively low power by floating the voltage amplifier on the output stage in a bootstrapped manner. A high impedance push-pull current drive is utilized to provide the voltage gain stage so that very little standby power is required. High power is consumed only during the relatively small time in which the amplifier is slewing.

2 Claims, 5 Drawing Figures

HIGH SPEED MAGNETIC DEFLECTION AMPLIFIER HAVING LOW-POWER DISSIPATION

This is a continuation, of application Ser. No. 177,879, filed Sept. 3, 1971, now abandoned.

BACKGROUND OF THE INVENTION

1. Field of the Invention

This invention relates to display systems and particularly to an improved high speed high voltage amplifier useful as a magnetic deflection amplifier with display tubes.

2. Description of the Prior Art

For displaying high speed raw sensor data such as live radar video, it is necessary to position the cathode ray tube beam of a display tube to any random spot on the tube face in a minimum of time. This time delay or slew time is the time required to change the stored energy in the yoke and the amplifier settle time which is a function of closed loop bandwidth. The maximum slew rate available is determined by the voltage across the yoke, that is, $t = (L/V)\ \Delta I$ where $L$ is the inductance of the deflection yoke, $V$ is the voltage across the yoke and $\Delta I$ is the required current change through the yoke. A maximum power dissipation rating of $V_1 \times I$ max is imposed on the amplifier where $V_1$ is the voltage across the amplifier and $I$ max is the current required for full scale deflection. Thus, in order to achieve high speeds during slewing, a substantial amount of power must be utilized. Because the relatively large slew voltages are only required during slew times and the amplifier would consume large amounts of power, if this voltage were present permanently, a slew voltage switching scheme has been utilized with a voltage on demand circuit which senses yoke voltage requirement and switches in the appropriate slew voltage as long as the requirement exceeds the threshold of normal character writing. In this switching arrangement, the voltage amplifier operates off plus or minus slew voltages to provide the appropriate drive signals to the output. In this type of switching arrangement, the driver dissipation has been found to require an excessive amount of power. It would be a substantial improvement in the art if a deflection amplifier were provided utilizing the slew voltage switching scheme but which allowed high speed deflection with a minimum of power dissipation and with a relatively wide bandwidth.

SUMMARY OF THE INVENTION

Briefly the magnetic deflection amplifier in accordance with the invention includes a voltage amplifier designed to handle slew voltages but operable at character writing voltages as a result of floating the voltage amplifier on the output stage so that high power is consumed only during the slewing time. The voltage gain stage of the amplifier is a high impedance push-pull current drive so as to utilize a minimum amount of power. By providing a high impedance current drive stage instead of a resistive load voltage gain stage, virtually no standby power is required in the system operation. The current drive stage deflection amplifier or current mode voltage amplifier is arranged so that small current changes provide relatively high voltage swings as a result of a unity voltage, high current gain stage at the output thereof. The current mode voltage amplifier includes an emitter follower stage for impedance matching. The first portion of the emitter follower stage is bootstrapped to the output voltage so as to allow a large voltage swing at the output by utilizing low voltage, high frequency transistors. The second portion of the emitter follower stage floats in voltage level in response to the switched character writing or slew voltages. The relatively low voltage of the first portion of the emitter follower stages and a high frequency by-pass in the second portion of the emitter follower stage provides a high bandwidth to the inductive load. Substantial power is only utilized during slewing operation which in turn is limited by either saturation or by current limiting.

It is therefore an object of this invention to provide a deflection amplifier utilizing switching between character writing and slewing, which operates with a relatively low power dissipation.

It is a further object of this invention to provide a high speed deflection amplifier for changing the current to an inductive coil in both a positive and a negative direction with a high degree of efficiency.

It is another object of this invention to provide a high bandwidth deflection amplifier for controlling the inductive coil in a display tube deflection yoke.

It is a still further object of this invention to provide a highly reliable magnetic deflection amplifier of the type in which switch voltages are used for slewing and which has the majority of components requiring only a relatively low voltage rating.

BRIEF DESCRIPTION OF THE DRAWINGS

These and other objects, features and advantages of the invention itself will become apparent to those skilled in the art in the light of the following detailed description taken in consideration with the accompanying drawings wherein like reference numerals indicate like or corresponding parts, throughout the several views wherein.

DESCRIPTION OF THE PREFERRED EMBODIMENT

Figure 1:
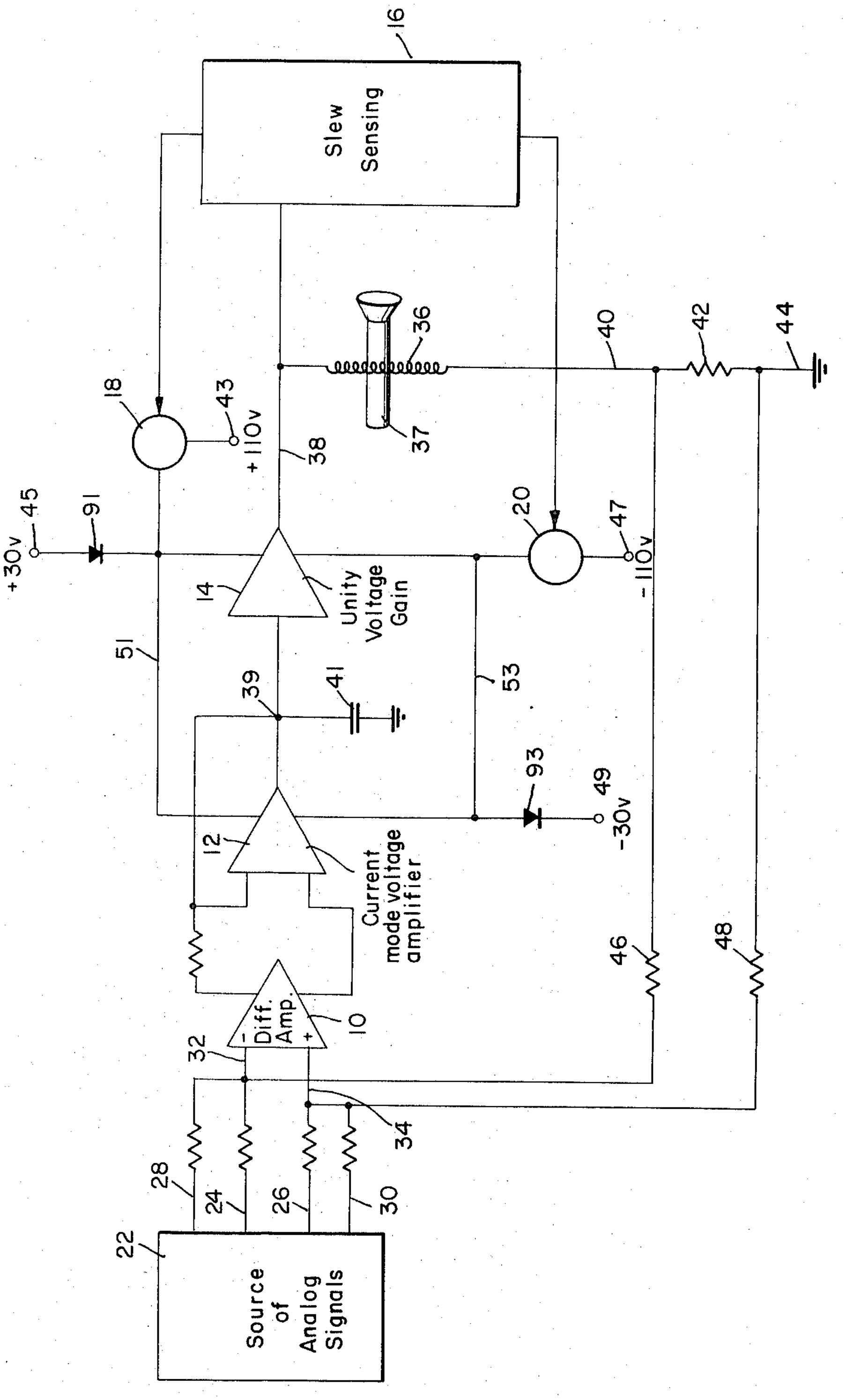
FIG. 1 is a schematic block and circuit diagram of the improved deflection amplifier system in accordance with the invention.

Referring first to FIG. 1, the high speed magnetic deflection amplifier in accordance with the invention includes a differential amplifier 10, a current mode voltage amplifier 12, an impedance matching stage 14 and a slew sensing circuit 16 for controlling switches 18 and 20. The deflection amplifier responds to a source of analog signals 22 which may convert digital signals to analog voltages on illustrative leads 24 and 26 representing the position of a symbol to be written on the screen of a cathode ray tube 37, for example, and analog voltages on leads 28 and 30 representing symbols to be written at the position indicated by the voltages on the leads 24 and 26. The leads 24 and 28 are applied through suitable resistors to a lead 32 which in turn is coupled to the negative terminal of the differential amplifier 10 and the leads 26 and 30 are coupled through suitable resistors to a lead 34 which in turn is coupled to the positive terminal of the differential amplifier 10. It is to be noted that the deflection amplifier of FIG. 1 may be utilized in only one dimension such as the X or the Y dimension and that a similar deflection amplifier is utilized in the other dimensions such as the Y dimension and that the analog voltages applied to the differential amplifier 10 only represent the voltages of the selected one dimension of the display surface. Also, it is to be understood that the principles of the invention are not limited to any particular coordinate system but may be adapted to any suitable arrangement. An inductor 36 having a value L may represent the deflection coil such as the X axis coil of the cathode ray tube 37. The inductor 36 is coupled between a lead 38 and a lead 40 which in turn is coupled through a sensing resistor 42 to ground through a lead 44. The lead 40 is coupled through a resistor 46 to the negative lead 32 and the lead 44 is coupled through a resistor 58 to the positive lead 34 of the differential amplifier 10 to provide the conventional differential amplifier operation. It is to be noted that the lead 44 may have sufficient length to provide significant impedance to ground potential.

The current mode voltage amplifier 12 responds to the differential signals provided by the differential amplifier 10 to develop a single ended output at a node 39. A feedback resistor $R_{fb}$ is coupled from the negative input of voltage amplifier 12 to the node 39 to provide a single ended amplifier operation. A capacitor 41 is coupled between the node 39 and ground which in addition to the component capacitance at the node, determines the bandwidth of voltage amplifier 12. The switch 18 in conjunction with diode 91 applies a slewing voltage of +110 volts from a terminal 43 to the output stage 14 and amplifier 12 instead of the character writing +30 volts from a terminal 45. The switch 20 in conjunction with diode 93 when energized for slewing, applies −110 volts from a terminal 47 instead of the character writing −30 volts from a terminal 49. The output section of voltage amplifier 12 is floated on the switched voltage leads 51 and 53. One portion of the unity voltage gain stage is floated relative to the output voltage. Thus the current mode operation and the floating stages provide a low level of power dissipation except during a slewing operation.

Figure 2:
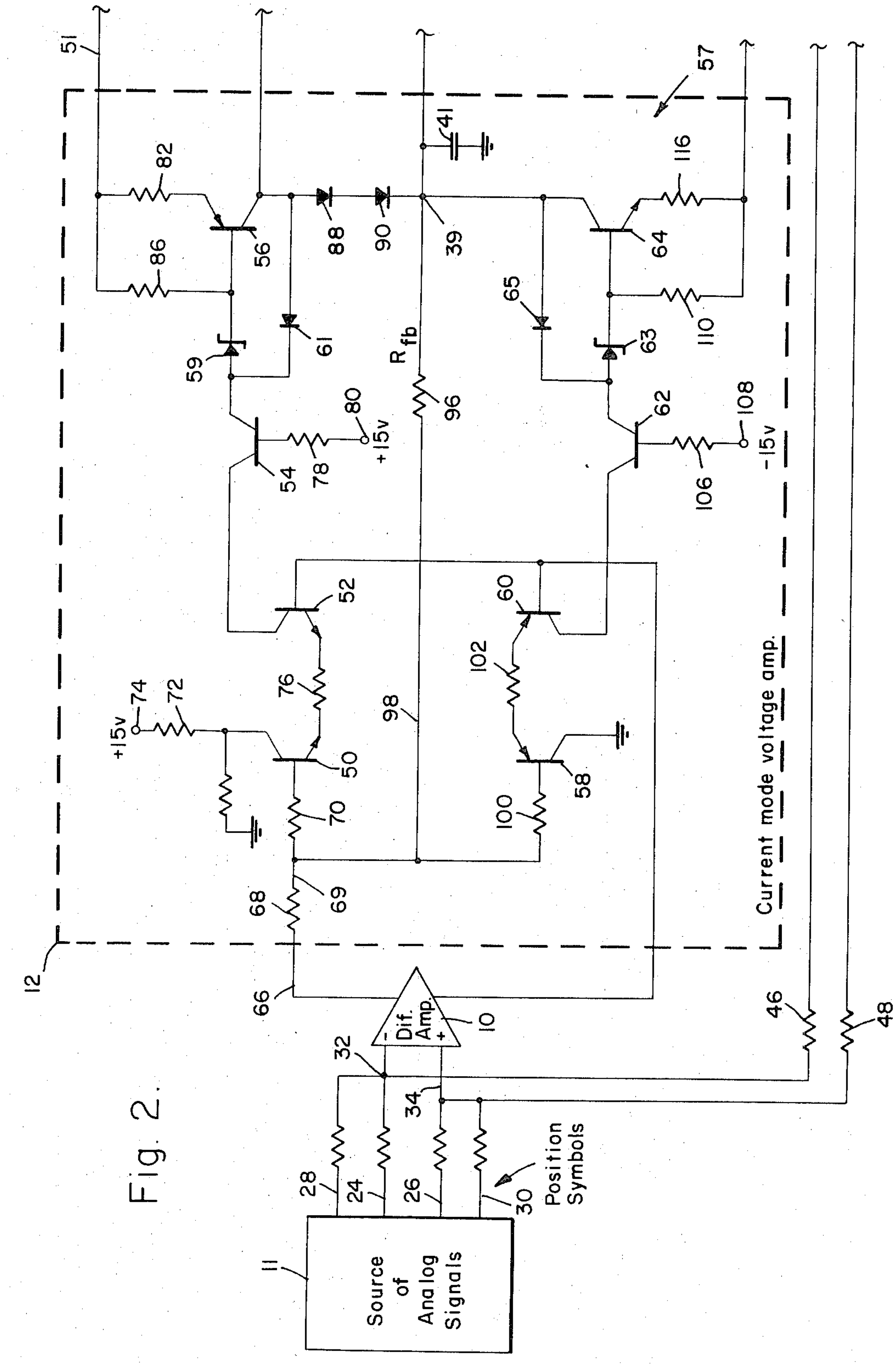
FIGS. 2 and 3 are schematic circuit and block diagrams showing more detail of the improved deflection amplifier system of FIG. 1.
Figure 3:
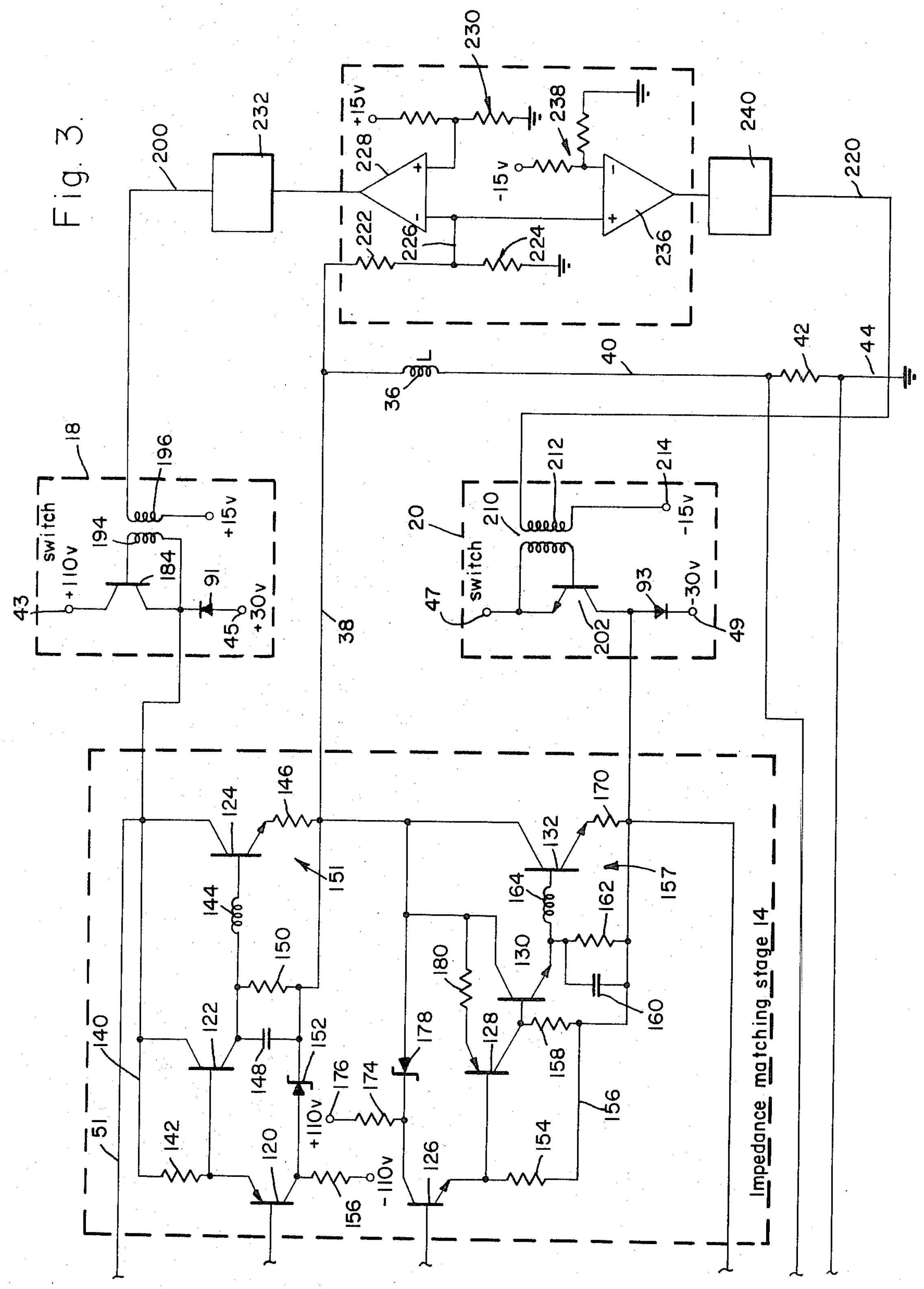

Referring now to FIGS. 2 and 3, showing an illustrative example of the voltage amplifier of FIG. 1 in further detail, the current mode voltage amplifier 12 includes an upper portion responsive to a first differential voltage applied to the amplifier 10 and includes npn transistors 50, 52 and 54 and a pnp transistor 56. The lower portion of the current mode voltage amplifier 12 is also responsive to the voltage applied to the differential amplifier 10 and includes pnp transistors 58, 60 and 62 and an npn transistor 64. A lead 66 from the amplifier 10 is applied through resistor 68 and 70 to the base of the transistor 50 in turn having its collector coupled through a resistor 72 to a +15 volt terminal 74 and its emitter coupled through a resistor 76 to the emitter of the transistor 52. A suitable biasing resistor is coupled between the collector of the transistor 50 and ground. The collector of the transistor 52 is coupled to the emitter of the transistor 54 having its base coupled through a suitable resistor 78 to a +15 volt terminal 80 and its collector coupled to the base of the transistor 56, which transistor has its emitter coupled through a resistor 82 to the lead 51 and its base coupled through a resistor 86 to the lead 51. A zener diode 59 has its anode to cathode path coupled between the collector of the transistor 54 and the base of the transistor 56 and the anode to cathode path of a diode 61 is coupled between the collector of transistor 56 and the collector of transistor 54 to provide nonsaturation operation of the transistor 56. The collector of the transistor 56 is coupled to the anode to cathode paths of suitable diodes 88 and 90 to the dominant node 39 in turn coupled to ground through the capacitor 41 which may partly represent a capacitor and partly the stray capacitance provided in the circuit. A feedback resistor 96 is coupled from the node 39 to the lead 69 to control the voltage gain and bandwidth from the lead 66 to the node 39. The lead 69 is also coupled through a base resistor 100 to the base of the transistor 58 in turn having its collector coupled to ground and its emitter coupled through a resistor 102 to the emitter of the transistor 60. The base of the transistor 60 is coupled to the base of the transistor 52 as well as to the second output of the amplifier 10 and the collector is coupled to the emitter of the transistor 62 in turn having its base coupled through a suitable resistor 106 to a −15 voltage terminal 108, providing a grounded base transistor arrangement. The transistors 50, 52, 58 and 60 form a differential transconductance stage to convert voltage signals to current signals. The collector of the transistor 62 is coupled through the cathode to anode path of a zener diode 63 to the base of the transistor 64 and in turn through a resistor 110 to the lead 53 which receives current from the emitter of the transistor 64 through a resistor 116. The collector of the transistor 64 is coupled to node 39 to provide negative current drive to this node. The transistors 56 and 64 are controlled to provide a push-pull current source 57. A diode 65 is coupled between the collector of the transistor 62 and the collector of the transistor 64 to provide a nonsaturating or limiting arrangement for the transistor 64. The transistors 56 and 64 may each have a high voltage grounded base transistor in series with the collector thereof so that the transistors 56 and 64 have a low voltage, wide bandwidth similar to the transistor combination of transistors 52 and 54 and transistors 60 and 62, in some arrangements in accordance with the invention.

The impedance matching or unity voltage gain stage 14 has a first portion including a pnp transistor 120 and an npn transistor 122 of an emitter follower stage and including an npn transistor 124 and has a lower section including npn transistor 126, a pnp transistor 128 and npn transistors 130 and 132 to provide A quasi-emitter follower. The transistor 120 forming the input portion of the emitter follower stage has its base coupled to the collector of the transistor 56, its emitter coupled to the base of the transistor 122 and its collector coupled through a resistor 136 to a −110 voltage terminal 138. The transistor 122 has its collector coupled to a lead 140 in turn coupled both to the lead 51 and through a resistor 142 to the base of the transistor 122 and has its emitter coupled through an inductor 144 to the base of the transistor 124. The emitter of the transistor 124 is coupled through a resistor 146 to the lead 38 and the emitter of the transistor 122 is coupled through a capacitor 148 and a resistor 150 of a network 151 to the lead 38. The collector of the transistor 120 is further coupled through a zener diode 152 to the output lead 38 so that the voltage across the transistor 120 is bootstrapped to, or floats with, the output voltage.

The node 39 is coupled to the base of the transistor 126 in turn having its emitter coupled both to the base of the transistor 128 and through a resistor 154 to a lead 156 in turn coupled to the lead 53. The collector of the transistor 128 is coupled through a resistor 158 to a lead 156 as well as to the base of the transistor 130 and the emitter of the transistor 130 is coupled through a capacitor 160 and a resistor 162 of a network 157 to the lead 156 as well as through an inductor 164 to the base of the transistor 132. The emitter of the transistor 132 is coupled through a resistor 170 to the lead 53 and the collector is coupled to the lead 38. The collector of the transistor 126 is coupled through a resistor 174 to a +110 volt terminal 176 as well as through a zener diode 178 to the lead 38 so that the voltage across transistor 126 is bootstrapped to or floats with, the output voltage. The emitter of the transistor 128 is coupled through a resistor 180 to the lead 38 and the collector of the transistor 130 is coupled to the lead 38.

The switch 18 which controls the positive voltages applied to the output stage and emitter of the transistor 56 may include a transistor 184 having a collector coupled to the +110 voltage terminal 43 for slew operation and an emitter coupled to the lead 51 as well as through the cathode to anode terminal of the diode 91 to the +30 volt terminal 45 for character writing operation. For a transformer coupled switch, a first winding 194 may be coupled between the base and the emitter of the transistor 184 and a second winding 196 may be coupled between a +15 volt terminal 198 and a lead 200. It is to be noted that any suitable switching arrangement such as a direct coupled or a transformer coupled switch may be utilized in accordance with the principles of the invention. The switch 20 which controls the negative character writing and slew writing voltages includes an npn transistor 202 having an emitter coupled to the −110 volt slew terminal 47 and a collector coupled to the lead 53 as well as through the anode to cathode path of the diode 93 to the −30 volt character writing terminal 49. For a transformer coupled switch a winding 210 may be coupled between the base and the emitter of the transistor 202 and a winding 212 may be coupled from a +15 volt terminal 214 to a lead 220.

The slew sensing circuit 16 includes series coupled resistors 222 and 224 coupled between the output lead 38 and ground to provide a voltage proportional to the output voltage on a lead 226. A comparison amplifier 228 for detecting positive slew voltages is coupled to the lead 226 and to a reference voltage source 230 to detect a slew voltage and apply a signal through a logic circuit 232 to the lead 200. The logic circuit 232, for example, may include a suitable hold off one-shot circuit. A comparator amplifier 236 receives the sensed voltage from the lead 226 and a negative reference voltage from a reference source 238 to apply a switching voltage through a logic circuit 240 to the lead 220.

Figure 4:
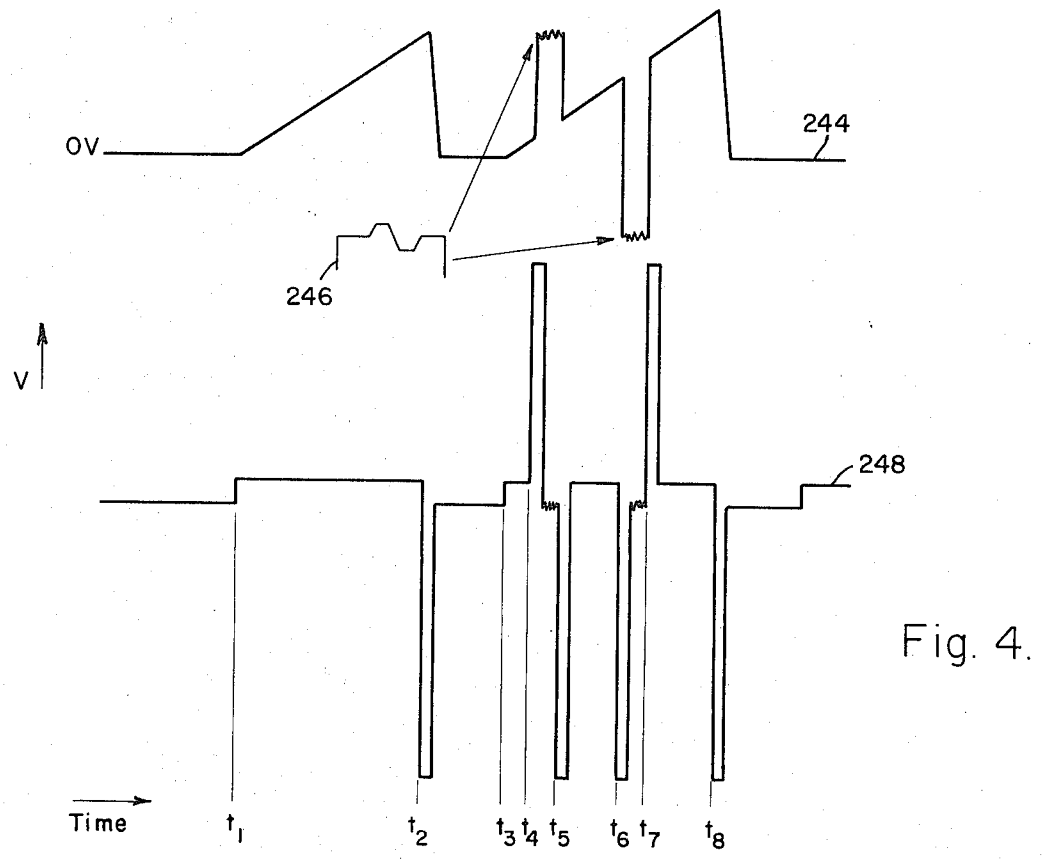
FIG. 4 is a schematic diagram of waveforms of voltage as a function of time showing the applied voltages and the slewing voltages developed by the deflection amplifier of FIG. 1.

Referring now also to the waveforms of FIG. 4, the general operation will first be described. The signal of the waveform 244 may represent the position voltage on the lead 24 for the polarity shown or the position voltage on the lead 26 if of opposite polarity from that shown. The voltage on the lead 40 may have a similar configuration to that of the waveform 244. A symbol voltage illustrated by a waveform 246 may be provided as a symbol voltage such as on the lead 28 and may have a substantially different scale than that of the waveform 244. The slew voltage of a waveform 248 represents the output voltage on the lead 38 in response to the position voltage of the waveform 244. The voltage on the lead 38 is substantially similar to the voltage developed across the capacitor 41, except for level shifts. At a time $t_1$, the X deflection voltage of the waveform 244 and which is proportional to $I_0$ is applied to the differential amplifier 10 and the voltage of the waveform 248 increases slightly to support the $\Delta I_0/\Delta t$ required in the coil 36. At the time $t_2$ when the X sweep voltage falls, a slew voltage condition is sensed and the negative slew voltage of the waveform 248 is developed on the lead 38. At time $t_3$, another X sweep starts without slewing and the voltage of the waveform 248 rises. At time $t_4$ for writing a symbol, a slew voltage condition is sensed and a positive slew voltage is applied to the lead 51 in response to the switch 18 and through the amplifier to lead 38. As shown by the waveform 248, the symbol waveform 246 writes a letter E, for example, (FIG. 5) prior to the voltage of the waveform 244 falling and developing a negative slew voltage of the waveform 248 at a time $t_5$. At time $t_6$, a negative excursion is developed as shown by the waveform 244 which requires both a negative and a positive slew voltage respectively at times $t_6$ and $t_7$ with a letter E being written at the end of the excursion period. At a time $t_8$, the second sweep voltage of the waveform 244 falls to its zero voltage level and the switch 20 in response to the slew sense circuit 16 applies a negative slew voltage to the lead 53 and through the amplifier to lead 38.

Figure 5:
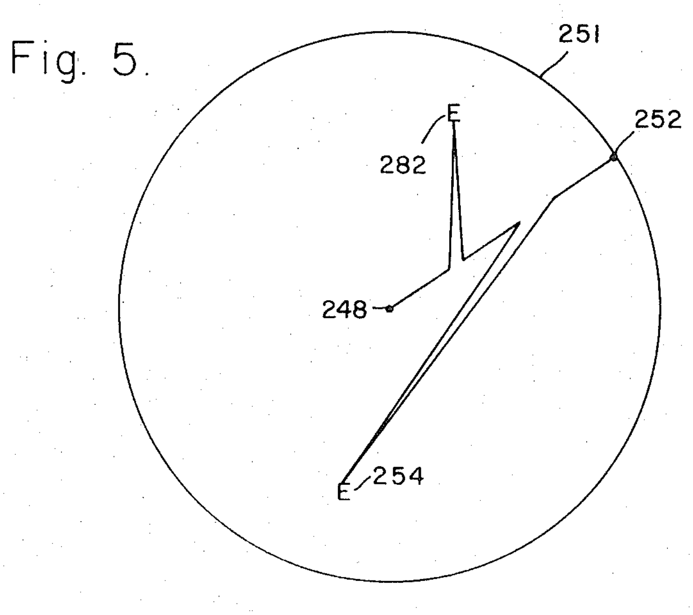
FIG. 5 is a schematic diagram of the screen of a cathode ray tube for illustrating a display that may be provided by the waveforms of FIG. 4.

Referring now also to FIG. 5 which shows a screen 251 of a display tube such as 37 having a center point 248 at which the beam may be positioned at times $t_1$ and $t_3$ moving to a position 252 at times $t_2$ and $t_8$. At the two excursions of times $t_4$ and $t_6$ to the respective points 250 and 254 an illustrative letter E may be written on the surface of the tube. It is to be noted that a similar amplifier operation may be provided in the other or Y dimension for providing the display of FIG. 5. Thus, the magnetic deflection amplifier in accordance with the invention provides large slew voltages on the lead 38 to rapidly change the current through the inductor 36 during slew operation and relatively small voltages on the lead 38 for normal character writing or sweeps.

Referring back now principally to FIGS. 2 and 3, the detailed operation of the wide bandwidth low power dissipation deflection amplifier will be further explained. In normal operation all of the transistors of the current mode voltage amplifier 12 and impedance matching stage 14 are biased into conduction in their gain region. The switches 18 and 20 are not energized and the +30 and −30 voltages are utilized on the leads 51 and 53. The first stage of the amplifier 12 including transistors 50, 52, 58 and 60 provides a differential transconductance converting voltage to current with appropriate level shifts. Because of the high impedance of the feedback resistor 96, and the high impedance of the impedance matching stage 14, small changes of current in and out of the node 39 make relatively large voltage swings thus providing a minimum of power dissipation. The transistors 50, 58, 52 and 60 are relatively wide bandwidth because of the low voltage requirements. The grounded base transistors 54 and 62 operate at level shifters providing approximately unity current gain, in which configuration the transistors have a relatively wide bandwidth. The transistors 56 and 64 have a relatively small voltage thereacross during character writing and a relatively wide bandwidth. The transistors 120 and 126 are bootstrapped to the lead 38 by the respective zener diodes 152 and 178 with the voltage thereacross relatively small and relatively wide bandwidth transistors may be utilized. The bypass paths of the network 151, 157 provide a wide bandwidth bypass to the relatively high voltage transistors 124 and 132, which transistors may represent a plurality of transistors in parallel. Relative to the entire amplifier, a positive voltage on the lead 24 results in a negative voltage being provided on the lead 40 as current flows from the lead 24 to the lead 32 through an input resistor, and a balancing current flows from the lead 40 through the resistor 46 to the lead 32, this occurring until the positive change on the lead 32 is balanced out. In response to a negative voltage change on the lead 24, current flows from a positive voltage on the lead 40 through the resistor 46 until the voltage change at lead 32 is cancelled out.

A slew operation in which a slew condition is sensed by the slew sensing circuit 16 will now be explained. In response to a differential voltage more positive on the lead 34 than on the lead 32, the transistor 50 is biased out of conduction, the transistor 52 is biased into conduction, the grounded base transistor 54 is biased into conduction and the transistor 56 is biased into conduction. At the same time the transistor 58 is biased into conduction, the transistor 60 is biased out of conduction and the transistors 62 and 64 are biased out of conduction. Thus, current passes through the transistor 56 and through the diodes 88 and 90 and through the resistor 96 for rapidly increasing the voltage level at the node 39. In the emitter follower stage 14 the transistor 120 is biased out of conduction, the transistors 122 and 124 are biased into conduction, the transistor 126 is biased into conduction, the transistors 128 and 130 are biased out of conduction and the transistor 132 is biased out of conduction. Thus the voltage at the node 39 is applied through the transistors 120, 122 and 124 to the lead 38 for increasing the voltage across the inductor 36. This results in a rise of voltage on the lead 40 which is fed back through the resistor 46 to the lead 32 to offset the negative voltage initially provided there in a normal amplifier feedback operation. Current flows from the lead 40 through the resistor 46 to balance current flowing from the lead 24 through the input resistor 48 to the lead 32. The high frequency components are passed through the network 151 to the lead 38.

In response to a differential voltage more positive on the lead 32 than on the lead 34, the transistor 50 is biased into conduction, the transistor 52 is biased out of conduction, which in turn biases the grounded base transistor 54 out of conduction. At the same time, the transistor 58 is biased out of conduction the transistor 60 is biased into conduction and the transistor 62 is biased into conduction. The transistor 56 is biased out of conduction and the transistor 64 is biased into conduction. As a result of current passing through the grounded base transistor 62, current passes from the node 39 through the collector to emitter path of the transistor 64 to the −30 volt terminal 208. The transistor 120 is biased into conduction, the transistor 122 is biased out of conduction and the transistor 124 is biased out of conduction. At the same time the transistor 126 is biased out of conduction, the transistor 128 is biased into conduction, the transistor 130 is biased into conduction and the transistor 132 is biased into conduction. The voltage at the node 39 is applied through the transistors 126 and 128 while high output current is provided by transistors 130 and 132 through the lead 38 to the inductor 36. The high frequency components of the input signal are applied through the network 157 to the lead 38 similar to the operation of the network 151.

Thus there has been described a high voltage amplifier suitable for a magnetic deflection amplifier that operates with a large bandwidth because of maintaining the voltage at relatively low levels at the first portion providing bypasses around the relatively high voltage transistors of the impedance matching stage. Also the emitter follower transistors and the following impedance matching transistors are bootstrapped to the output voltage so as to float with variations thereat. Upon sensing of slew voltages, the amplifier is saturated and limited so that the specified group of transistors provides a positive slew voltage at the inductor or another set of transistors provides a negative slew voltage at the inductor. It is only during a sensed slew condition that a relatively high amount of power is utilized. During a slew operation relatively wide band characteristics of the amplifier are maintained.

What is claimed is:

1. A deflection amplifier responsive to signals applied thereto from a source of signals for controlling the current through an inductor for operating in a character writing mode and a slewing mode, said deflection amplifier including: a voltage amplifier stage having an input voltage amplifier section coupled to said source of signals and an output push-pull current source section; an impedance matching stage responsive to the output signals from said push-pull current source section and having output circuits coupled to said inductor so as to control the current therethrough; feedback means for applying a voltage representative of the current through the inductor, to the input of said input voltage amplifier section; positive voltage supply means responsive to the voltage across said inductor, for applying an output voltage of a first positive value when the voltage across the inductor is less than a preselected positive value in character writing mode and for applying an output voltage of a second positive value when the voltage across the inductor is greater than the preselected positive value in slewing mode; negative voltage supply means responsive to the voltage across said inductor, for applying an output voltage of a first negative value when the voltage across the inductor is less negative than a preselected value in character writing mode and for applying an output voltage of a second negative value when the voltage across the inductor is more negative than said preselected negative value in slewing mode; means for coupling the output signals from said positive and negative voltage supply means to said impedance matching stage; and wherein said impedance matching stage includes means for deriving the current applied to said inductor from said output signals from said supply means; and wherein the improvement comprises:

means for applying the output signals from said positive and negative voltage supply means to said output push-pull current source section of said voltage amplifier stage so that a first current source section thereof is coupled between the output of said positive voltage supply means and a potential substantially equal to the voltage across said inductor, and so that a second current source section of said output push-pull section is coupled between the output of said negative voltage supply means and the potential substantially equal to the voltage across said inductor;

said means for applying an output signal from said positive and negative supply means being also coupled to said impedance matching stage so that a first stage thereof is coupled between said positive voltage supply means of a potential substantially equal to the voltage across said inductor, and so that a second stage of said impedance matching stage is coupled between the output of said negative supply means and the potential substantially equal to the voltage across said inductor;

said first positive supply voltage being applied during the character writing mode and said second positive supply voltage being applied during the slewing mode;

said first negative supply voltage being applied during the character writing mode and said second negative supply voltage being applied during the slewing mode; and feedback means coupling the output of said push-pull current source section to the input voltage amplifier section of said voltage amplifier stage for providing a feedback signal for improving the small signal bandwidth thereof.

2. The invention according to claim 1 includes a differential amplifier having an input and an output, said input being coupled to said source of signals for controlling the current through an inductor and said output being coupled to said voltage amplifier stage.

* * * * *